(12) United States Patent
Kaye et al.

(10) Patent No.: US 7,016,407 B2
(45) Date of Patent: Mar. 21, 2006

(54) PRE-PROCESSING OF BIT RATE ALLOCATION IN A MULTI-CHANNEL VIDEO ENCODER

(75) Inventors: James E. Kaye, Pleasanton, CA (US); Paul E. Haskell, Saratoga, CA (US); Arthur C. Manansala, Tracy, CA (US)

(73) Assignee: General Instrument Corporation, Horsham, PA (US)

( * ) Notice: Subject to any disclaimer, the term of this patent is extended or adjusted under 35 U.S.C. 154(b) by 829 days.

(21) Appl. No.: 09/837,496

(22) Filed: Apr. 18, 2001

(65) Prior Publication Data

US 2001/0014121 A1    Aug. 16, 2001

Related U.S. Application Data

(63) Continuation of application No. 09/097,645, filed on Jun. 16, 1998, now Pat. No. 6,259,733.

(51) Int. Cl.
*H04N 7/12* (2006.01)

(52) U.S. Cl. ............ 375/240.01; 375/240; 375/240.02; 375/240.12

(58) Field of Classification Search ................ 375/240, 375/240.01, 240.12, 240.25, 265, 240.02, 375/240.16; 348/449; 370/468
See application file for complete search history.

(56) References Cited

U.S. PATENT DOCUMENTS

| | | | | |
|---|---|---|---|---|
| 4,630,098 A | * | 12/1986 | Fling | ........................... 348/449 |
| 5,216,503 A | | 6/1993 | Paik et al. | |
| 5,291,281 A | | 3/1994 | Paik et al. | ............... 348/384.1 |
| 5,321,725 A | * | 6/1994 | Paik et al. | ................... 375/265 |
| 5,376,968 A | | 12/1994 | Wu et al. | |
| 5,400,401 A | | 3/1995 | Wasilewski et al. | |
| 5,461,619 A | | 10/1995 | Citta et al. | ................... 370/468 |
| 5,500,676 A | | 3/1996 | Tanaka et al. | ........... 348/386.1 |
| 5,506,844 A | | 4/1996 | Rao | ........................... 370/468 |
| 5,509,017 A | | 4/1996 | Brandenburg et al. | ...... 370/477 |
| 5,686,963 A | | 11/1997 | Uz et al. | ................ 375/240.06 |
| 5,708,664 A | | 1/1998 | Budge et al. | ................ 370/538 |
| 5,793,425 A | * | 8/1998 | Balakrishnan | ......... 375/240.25 |
| 5,862,140 A | * | 1/1999 | Shen et al. | ................... 370/468 |
| 5,933,450 A | | 8/1999 | Ozkan et al. | ................ 375/224 |
| 5,990,957 A | | 11/1999 | Ryoo | ..................... 375/240.03 |
| 6,038,256 A | * | 3/2000 | Linzer et al. | .......... 375/240.12 |

* cited by examiner

*Primary Examiner*—Allen Wong
(74) *Attorney, Agent, or Firm*—Robert P. Marley

(57) ABSTRACT

A method and apparatus for bit rate allocation, or statistical multiplexing, in a multi-channel video data encoder. A pre-processor in each channel determines a bit rate need prior to compression and encoding. A control processes the bit rate need in each channel to arrive at an allocated bit rate for each channel. The video data is then compressed and encoded according to the allocated bit rate. The bit rate demand accounts for various characteristics of the current picture data in each channel, including spatial activity, temporal activity, image size, frame rate, scene change, brightness, flash, fade, and horizontal pixel resolution. The system also biases the bit rate allocation according to inter-frame distance, whether the average spatial activity level is below a lower threshold, whether the inter-frame distance is above an upper threshold or below a lower threshold, whether the quantization of previous frames is above an upper threshold, the length of the Group of Pictures (GOP), and a user-selectable priority factor. The system also allocates any surplus bit rate among the channels to avoid having unused bandwidth.

24 Claims, 7 Drawing Sheets

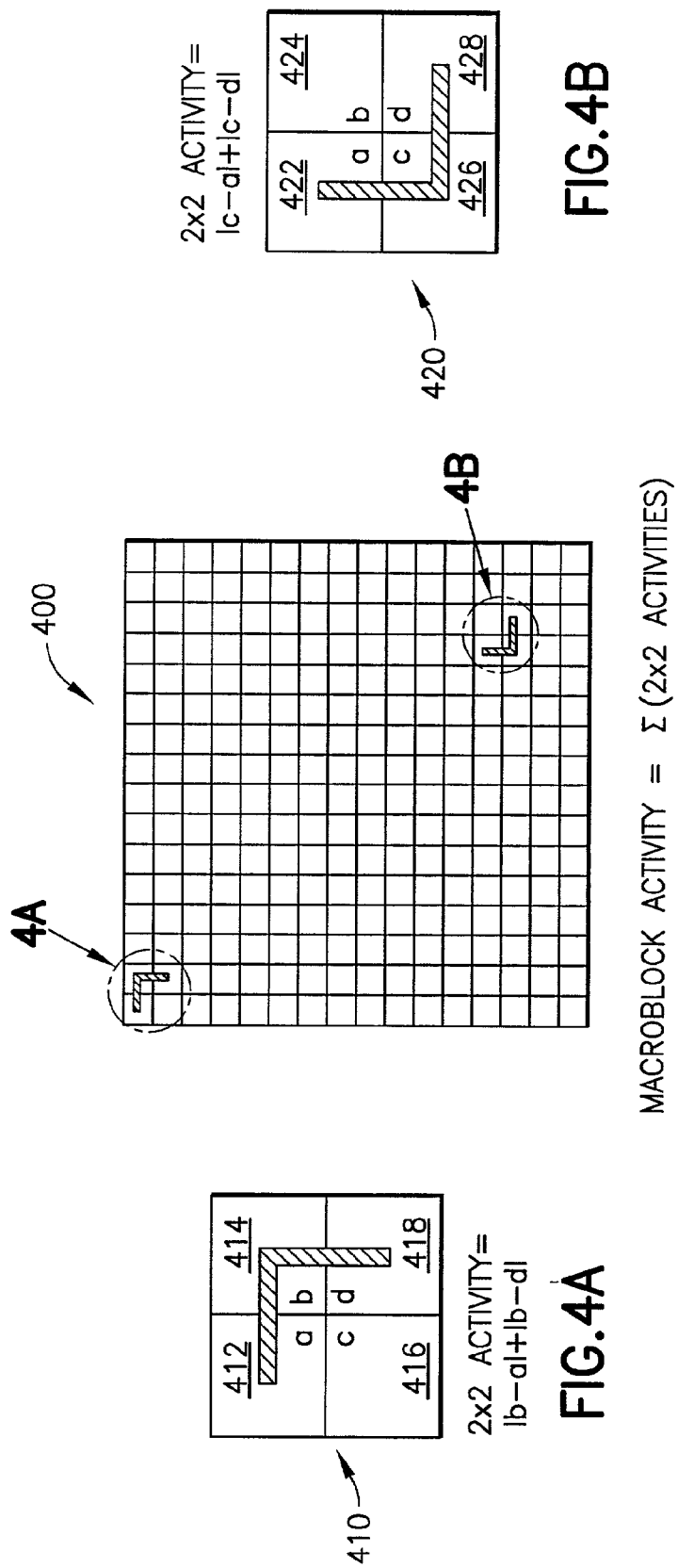

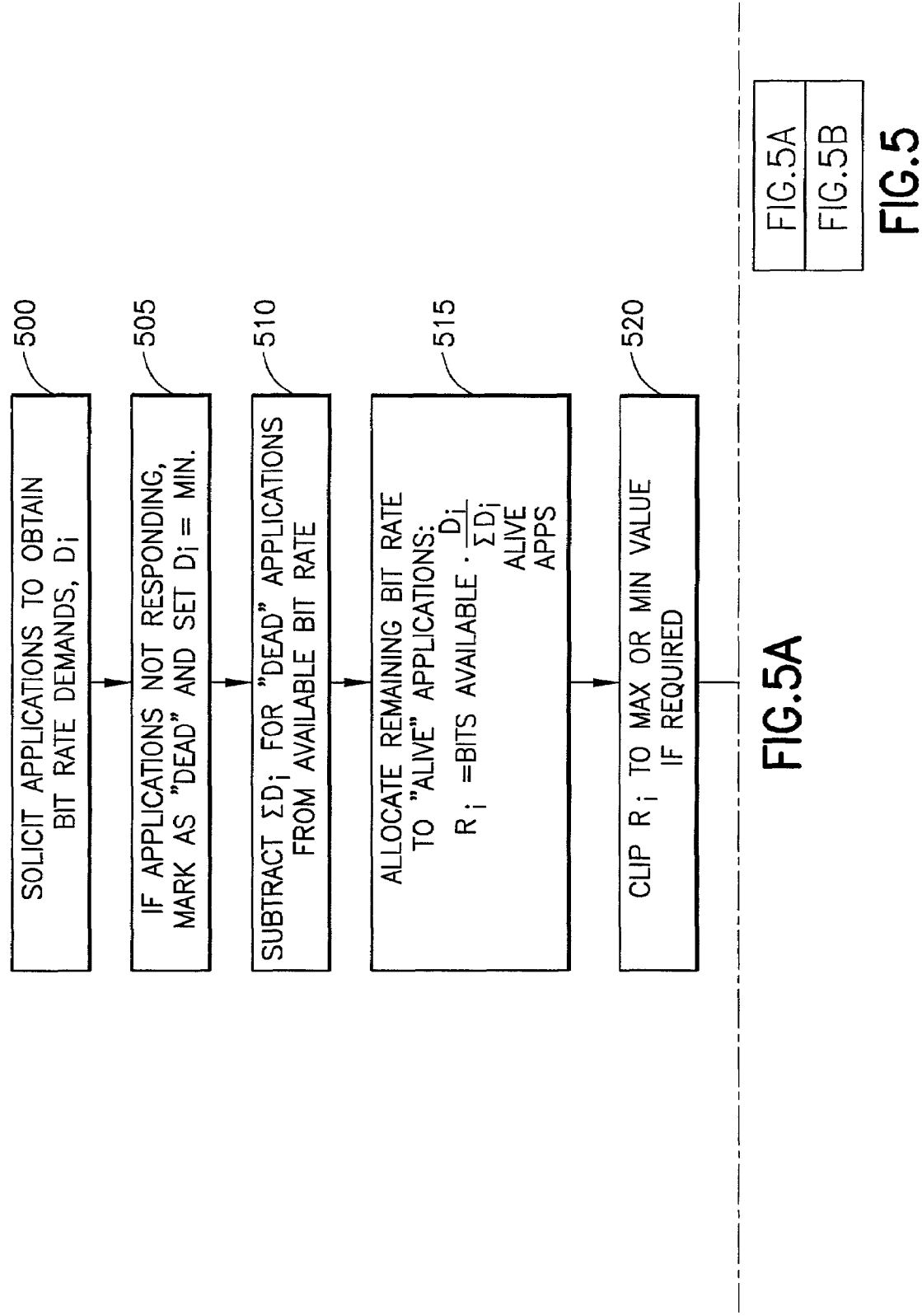

PRE-PROCESSING OF BIT RATE ALLOCATION IN A MULTI-CHANNEL VIDEO ENCODER

This application is a continuation of application Ser. No. 09/097,645, filed on Jun. 16, 1998 now U.S. Pat. No. 6,259,733.

BACKGROUND OF THE INVENTION

The present invention relates to a method and apparatus for bit rate allocation in a multi-channel video data encoder. The invention relates generally to statistical multiplexing, wherein a bit rate (e.g., bandwidth) is allocated to the different channels based on the channels' bit rate needs and the overall available bandwidth.

Statistical multiplexing is the process of encoding a number of signals at variable bit rates and combining the variable-rate bitstreams into a single fixed-rate transport stream so that the bandwidth allotted to each signal is flexible and varies with each signal's bit rate need. Conventionally, an estimate of bit rate need is made based on signal statistics. After a bit rate is allocated based on the need, the data in each signal is compressed and encoded using a specific quantization level. The amount of data that results from the compression is examined in each channel, and the quantization level is adjusted so that channels with more encoded data receive a higher bit rate. Next, the video data is compressed and encoded again using the adjusted quantization level. The process may be repeatedly successively in multiple feedback cycles. Other conventional techniques attempt to equalize a quantization distortion measure across the channels.

However, the conventional techniques have various drawbacks. For example, the use of successive feedback cycles in the compressor can be time-consuming and computationally intensive. Additionally, special bit rates needs for specific types of video scenes may not be considered. Moreover, the equalization of a quantization distortion measure does not reliably translate to an equalization of perceived image quality.

Accordingly, it would be desirable to provide a high-performance dynamic rate allocation system that quickly and accurately allocates bit rate to a plurality of video channels to equalize the overall image quality of all channels at any time instant. The system should provide a pre-processor which measures statistical information of the video data prior to compression and encoding to estimate the relative bit rate required to adequately encode each video scene. The measurements should be made sufficiently early in the encoding process to eliminate undesirable time delays. The system should provide the allocated bit rate to the video compressor from the pre-processor in a feedforward path to avoid undesirable feedback. The system should also provide the capability for feedback processing to fine tune the allocated bit rate before providing it to the compressor.

Furthermore, the system should measure or detect at least some of the following characteristics of each video frame (e.g., picture): spatial activity, temporal activity, image size, frame rate, scene change, brightness, flash, fade, and horizontal pixel resolution. The system should bias the bit rate allocation according to inter-frame distance, whether the average spatial activity level is below a lower threshold, whether the inter-frame distance is above an upper threshold or below a lower threshold, whether the quantization of previous frames is above an upper threshold, the length of the Group of Pictures (GOP), and a user-selectable priority factor.

The system should also allocate any surplus bit rate, if any, among the channels, to avoid having unused bandwidth.

The system should be compatible with progressive or interlaced video, as well as different image shapes and sizes, including Video Object Planes (VOPs).

The system should further be compatible with different video standards including NTSC, PAL, and NTSC detelecine.

The system should provide a pre-processor which can be used with existing commercially available compression circuitry to allow quick and inexpensive retrofitting of such circuitry.

The present invention provides a system having the above and other advantages.

SUMMARY OF THE INVENTION

The present invention relates to a method and apparatus for bit rate allocation in a multi-channel video data encoder.

A method for allocating a bit rate to a plurality of variable rate video channels in a video encoder includes the steps of: processing video data from a current picture (e.g., frame) in each respective channel to determine at least a spatial activity and a temporal activity thereof; and determining a bit rate demand $D_i$ for each current picture according to the associated spatial activity and temporal activity.

The method is suitable for use with multiplexed channels that are all variable rate, as well as with a combination of fixed rate and variable rate channels.

The method may include the further step of adjusting the bit rate demand $D_i$ for each current picture according to whether at least one of a scene change, fade and flash is detected for the current picture. Generally, bit allocation is increased if any of these events are detected since such events cannot usually be efficiently coded.

The method may include the further steps of increasing the associated temporal activity of each current picture if the associated spatial activity is below a lower threshold; and adjusting the bit rate demand $D_i$ for each current picture according to the increasing step. This is done since motion within a scene with a low spatial activity will produce an artificially small inter-frame difference.

The method may include the further steps of increasing the bit rate demand $D_i$ for each current picture when the associated temporal activity exceeds an upper threshold; and/or decreasing the bit rate demand $D_i$ for each current picture when the associated temporal activity is less than a lower threshold. This is done since high motion scenes require additional bits to maintain a given image quality while fewer bits are required for low motion scenes.

The method may include the further steps of determining a quantization level of at least one previous picture for each current picture; and increasing the bit rate demand $D_i$ for each current picture when the quantization level of the at least one previous picture exceeds an upper threshold. This is done to avoid oscillations in the quantization level that may be noticeable to a viewer.

Each current picture may be part of an associated Group Of Pictures (GOP), where each GOP typically includes one or more intra-coded pictures and several inter-coded pictures. In this case, the method may include the further steps of decreasing the bit rate demand $D_i$ for each current picture when a length of the associated group of pictures exceeds a nominal level; and/or increasing the bit rate demand $D_i$ for each current picture when a length of the associated group of pictures is less than a nominal level. This is done since fewer bits are required to code a large GOP since there are relatively more inter-coded (e.g., predictive coded pictures), such as B- and P-pictures.

The method may include the further step of reducing or eliminating the increase or decrease of the increasing and decreasing steps, respectively, when the temporal activity of each current picture exceeds an upper threshold. This is done since high motion is likely to result in relatively more intra-coded pictures in a GOP.

The method may include the further step of adjusting the bit rate demand $D_i$ for each current picture according to a horizontal pixel resolution thereof. This is done since more bits are required to code a higher resolution picture.

The method may include the further steps of determining a brightness level for each current picture; and increasing the bit rate demand $D_i$ for each current picture when the associated brightness level is less than a lower threshold. Darker scenes should be coded with additional bits to maintain a perceived image quality.

The method may include the further step of adjusting the bit rate demand $D_i$ for each current picture according to priority factor thereof that indicates a relative importance of each current picture in the multiplexed data stream. Thus, more important channels, such as movies and pay per view events, for example, may be allocated additional bits to provide an enhanced picture.

Moreover, the allocated bit rate for each current picture used in the encoding step may be determined in a single iteration or in successive iterations.

The method may comprise the further steps of determining an overall available bit rate for transmitting the current pictures in a multiplexed data stream; determining an allocated bit rate for each current picture according to a ratio of bit rate demand of each current picture and a sum of the bit rate demands from each current picture; and providing the allocated bit rate for each current picture to respective video data compressors for compressing the respective current pictures to obtain compressed video data for transmission in said multiplexed data stream.

When the allocated bit rate for each current picture is determined in a plurality of iterations including an initial iteration and at least one successive iteration, the method may include the further steps of determining a bit rate surplus or deficit between the overall available bit rate and a sum of the allocated bit rates for each current picture in the initial iteration; and allocating the surplus or deficit among at least some of the current pictures according to a ratio of bit rate demand of the at least some of the current pictures and a sum of the bit rate demands of the at least some of the current pictures in the at least one successive iteration. A satisfactory final bit rate can be converged on usually in about three total iterations.

A corresponding apparatus is also presented.

BRIEF DESCRIPTION OF THE DRAWINGS

FIGS. 4, 4A and 4B illustrate how macroblock activity is calculated in accordance with the present invention.

DETAILED DESCRIPTION OF THE INVENTION

The present invention relates to a method and apparatus for bit rate allocation in a multi-channel video data encoder.

Figure 1:
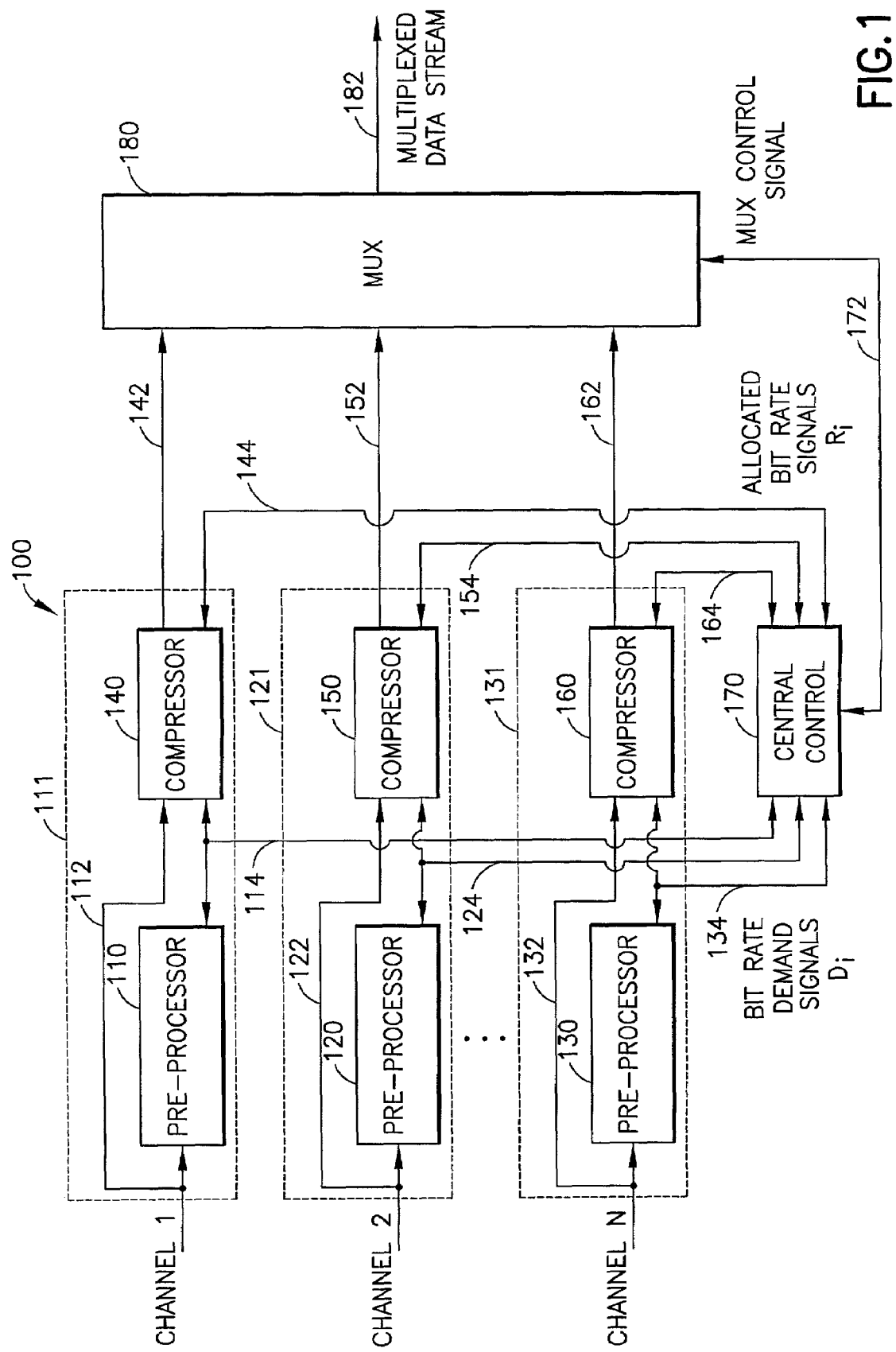
FIG. 1 illustrates a multi-channel video encoder in accordance with the present invention.

FIG. 1 illustrates a multi-channel video encoder in accordance with the present invention. A multi-channel video encoder shown generally at 100 includes a number N of channel encoders 111, 121, . . . , and 131. Each channel encoder, also referred to as an application, includes a pre-processor and a compressor. These components need not be physically separate but may be implemented in shared hardware, firmware and/or software. However, in a particularly advantageous embodiment of the present invention, the pre-processor circuitry is used with existing commercially available video compression circuitry to allow quick and easy retrofit of an existing channel encoder.

A first channel encoder 111 includes a pre-processor 110 and a compressor 140, while a second channel encoder 121 includes a pre-processor 120 and a compressor 150, and an Nth channel encoder 131 includes a pre-processor 130 and a compressor 160. Each compressor may be implemented using a commercially available video processor, such as those available from C-Cube Microsystems, Milpitas, Calif., USA.

Each compressor performs conventional compression and encoding steps such as motion compensation and estimation, transform coding (e.g., using the Discrete Cosine Transform), and Huffman encoding. Pixel data from a first, second and Nth channel are provided to pre-processors 110, 120 and 130, respectively. Each pre-processor may operate in parallel, and performs calculations using the respective pixel data to determine a bit rate demand $D_i$ for each ith channel. A corresponding bit rate demand signal is provided from each pre-processor to a central control 170. For example, pre-processor 110 may communicate with the central control 170 via line 114, while pre-processor 120 communicates with the central control 170 via line 124, and pre-processor 130 communicates with the central control 170 via line 134. The central control 170 may be implemented as a microprocessor using known circuitry. Moreover, each pre-processor 110, 120, 130 may communicate with the central control 170 via a bus in a time-sharing manner. Each pre-processor may also communicate with the respective compressor.

The central control 170 processes the bit rate demand signals $D_i$ to determine an allocated bit rate $R_i$ for each ith channel as explained in greater detail in FIG. 5 below. The respective allocated bit rate signals $R_i$, where i=1, 2, . . . N, are provided to the compressor 140, compressor 150, and compressor 160 via lines 144, 154, and 164, respectively. Each compressor also receives the pixel data from its respective channel. For example, compressor 140 receives the channel "1" pixel data via line 112, while compressor 150 receives the channel "2" pixel data via line 122, and compressor 160 receives the channel N pixel data via line 132.

Each compressor compresses and encodes the respective pixel data according to the allocated bit rate $R_i$, which is provided as a feedforward signal from the pre-processor to the respective compressor. Once the control 170 receives the $D_i$ values from the pre-processors, the control calculates a final $R_i$ in one or more iterations, and provides the final $R_i$ value to the compressors.

The pixel data which is compressed and encoded at the respective compressors at the allocated bit rate is then provided to a multiplexer (MUX 180) to provide a time multiplexed data stream (e.g., transport stream) on line 182. Specifically, the MUX 180 receives compressed pixel data from compressor 140 via line 142, from compressor 150 via line 152, and from compressor 160 via line 162. The MUX 180 also receives a control signal from the central control 170 via line 172 for synchronizing the multiplexing of the video data from the respective channels. The MUX 180 and control 170 need not be physically separate but may be implemented in shared hardware, firmware and/or software.

Figure 2:
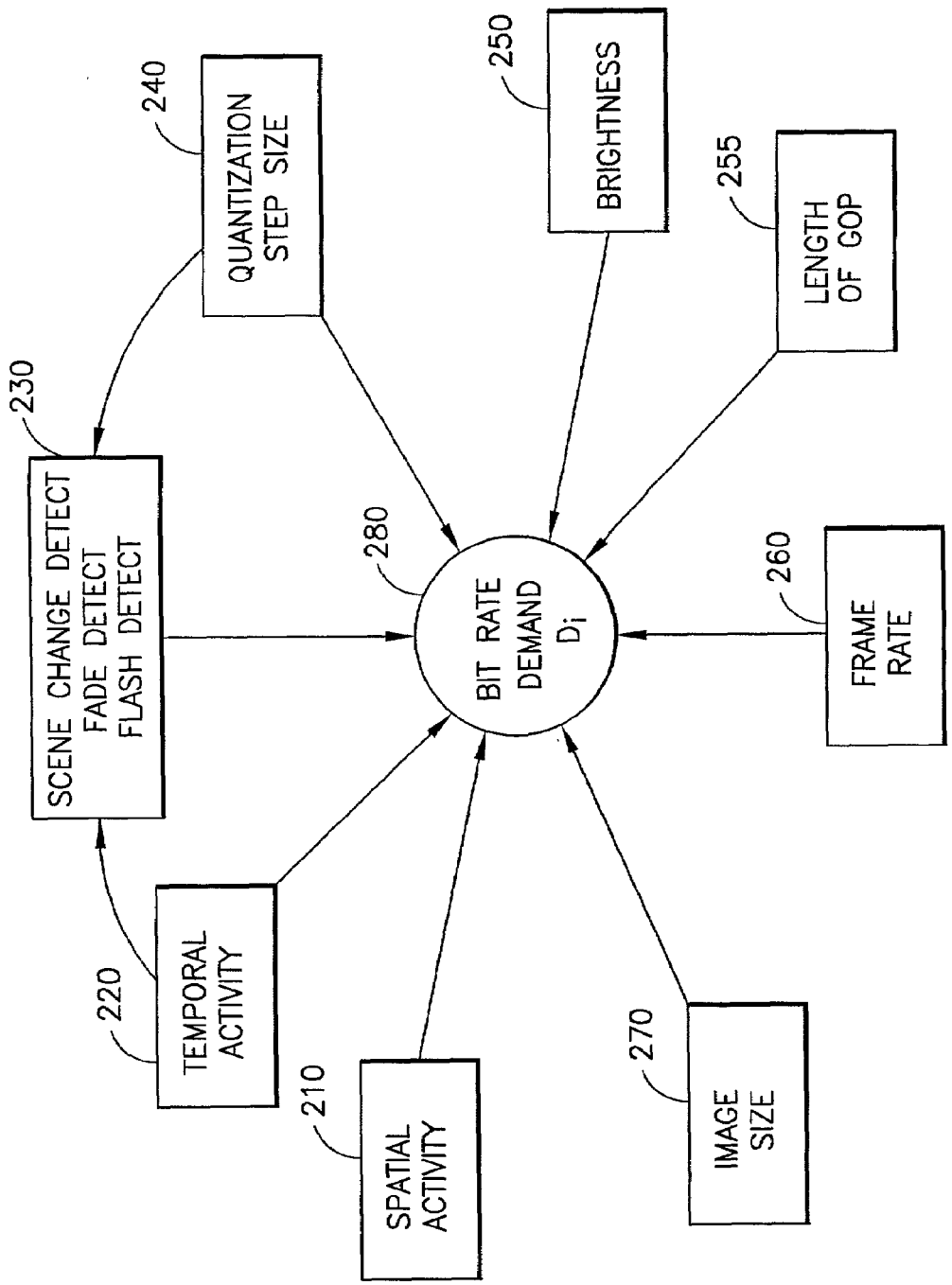
FIG. 2 illustrates conceptually how bit rate demand is determined for a video channel in accordance with the present invention.

FIG. 2 illustrates conceptually how bit rate demand is determined for a video channel in accordance with the present invention. The bit rate demand $D_i$ from the ith channel is an indication of the complexity of the video source being compressed. Note that the terms "bit demand" and "bit rate demand" may be used interchangeably, as the bit rate demand is simply the bit demand in a specific time interval. At block 210, the spatial activity of a current video frame is calculated. The spatial activity, or intra-frame activity, is an average macroblock activity for the frame as discussed in greater detail below in FIGS. 4, 4A and 4B.

Note that the term "frame" or "picture" as used herein refers generally to any image, including a particular field of interlaced video, a progressive mode frame, or even a Video Object Place (VOP), which is an image in a sequence of generally arbitrarily-shaped images. VOPs are discussed in the MPEG-4 standard.

At block 220, a temporal or inter-frame activity of the current video frame is calculated. At block 230, the scene change, fade, and flash detection is made. At block 240, the average quantization step size for the current video frame is determined. The scene change, fade, and flash detect block 230 receives data inputs from the temporal activity block 220 and quantization step size block 240. At block 250, the brightness of the current frame is determined, while at block 260, the frame rate is determined, and at block 270, the current image size is determined. Information from each of the blocks 210, 220, 230, 240, 250, 260 and 270 is then provided to the bit rate demand block 280 to determine $D_i$.

At block 220, the temporal activity of the current frame is determined as the sum of the absolute pixel differences between the current and previous frames. Each pixel difference is determined for correspondingly situated pixels within the respective frames. Referring to block 240, the quantization step size is the result of compressing a prior picture at a previously-determined bit rate. At block 230, the scene change, fade, and flash detect may be performed using any known technique. For example, a fade may be detected if the average picture brightness is decreasing over a number of frames. Moreover, a flash may be detected when the picture brightness increases rapidly above an upper threshold.

At block 250, the brightness is determined as the average pixel luminance in the current frame. At block 260, the frame rate is determined according to the interval between the current and previous frames. The frame rate may vary, for example, between standard NTSC video, with thirty frames per second, PAL video at twenty-five frames per second, and NTSC detelecine video at an average of twenty-four frames per second.

At block 255, a length of the group of pictures (GOP) is also provided as an input for determining the bit rate demand $D_i$. At block 270, the image size of the current frame is determined based on the horizontal resolution, or number of pixels per line.

Figure 3A:
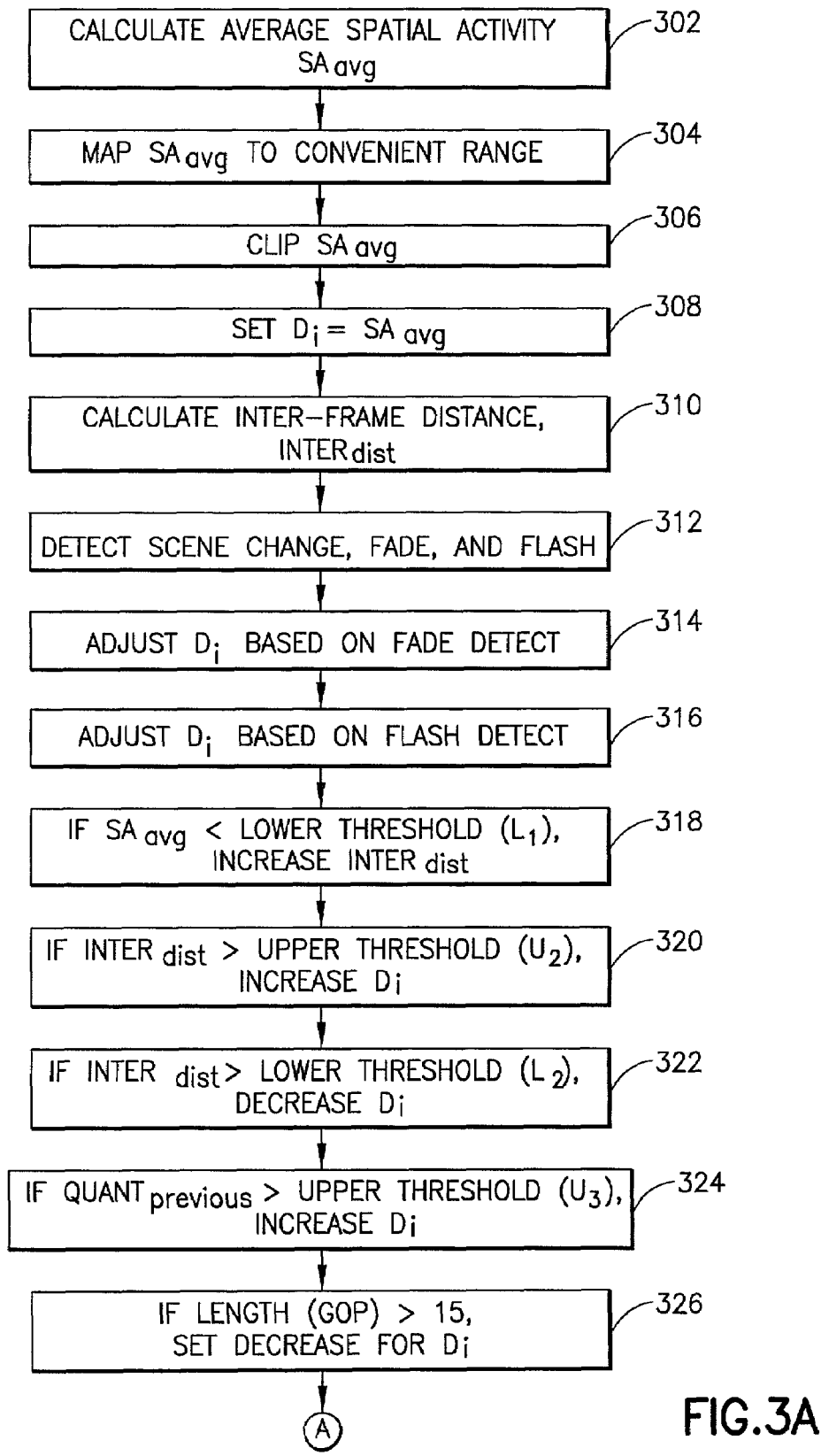
FIG. 3A is Part A of a flowchart illustrating how bit rate demand $D_i$ is determined in accordance with the present invention.
Figure 3B:
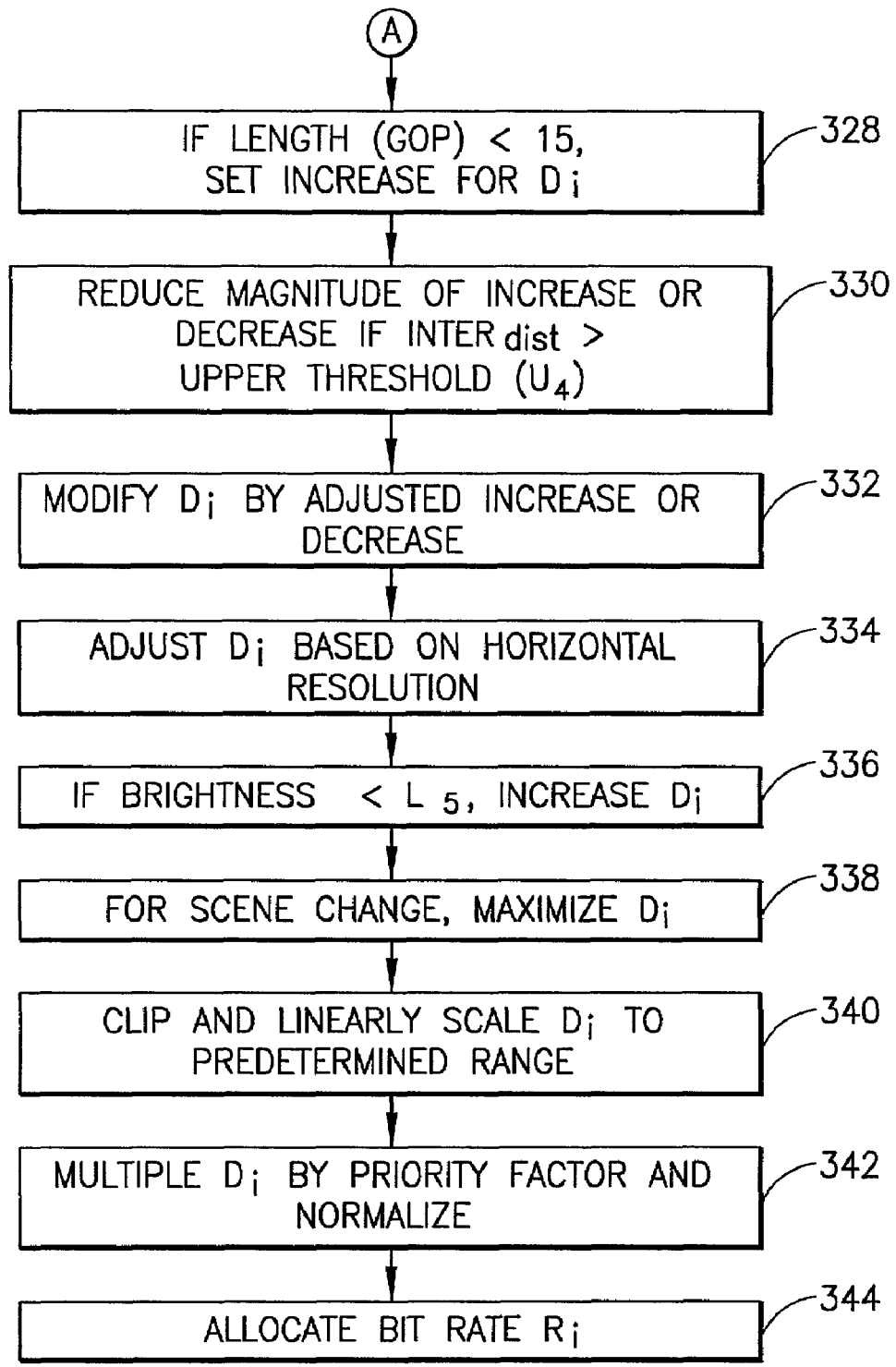
FIG. 3B is Part B of the flowchart of FIG. 3A illustrating how bit rate demand $D_i$ is determined in accordance with the present invention.

FIG. 3A is Part A of a flowchart illustrating how bit rate demand $D_i$ is determined in accordance with the present invention. FIGS. 3A and 3B illustrate an exemplary process that is used by the pre-processors in determining a bit rate demand $D_i$ for the respective video channel. It will be appreciated that the different steps may be performed in different sequences, that not every step is required, and that additional steps which are not shown may be performed. At block 302, the average spatial activity $SA_{avg}$ is calculated for the current frame. The calculation of $SA_{avg}$ is discussed further in connection with FIGS. 4, 4A and 4B, below. In block 304, the average spatial activity is optionally mapped to a more convenient range. At block 306, $SA_{avg}$ is clipped to remove especially high or low values. The actual values used for clipping can be determined by experimentation. At block 308, the initial bit rate demand for the ith channel, $D_i$, is set to the average spatial activity value.

At block 310, the inter-frame distance $INTER_{dist}$ is calculated as the sum of the absolute differences of the luminance pixel values between the current and previous frames. $INTER_{dist}$ is a measure of temporal activity for the current frame. At block 312, a scene change, fade, and flash detection is made. At block 314, the bit rate demand $D_i$ is adjusted based on whether a fade is detected. Specifically, if a fade is detected, $D_i$ may be increased by a predetermined amount that can be set by experimentation. $D_i$ is increased since coding of fades is generally inefficient. That is, additional bits are required to maintain a given video quality level. Similarly, at block 316, $D_i$ is adjusted based on whether a flash is detected for the current frame. If a flash is detected, $D_i$ is increased by a predetermined amount that can be determined by experimentation.

At block 318, if $SA_{avg}$ is less than a lower threshold, $INTER_{dist}$ is increased. This is done since motion within a scene with a low spatial activity will produce an artificially small inter-frame distance. At block 320, if $INTER_{dist}$ is above an upper threshold which can be determined by experimentation; $D_i$ is increased. This is done since the inventors have determined that very high levels of inter-frame activity are relatively more noticeable and therefore require additional bits to maintain a given image quality level. Conversely, as block 322, if $INTER_{dist}$ is below a lower threshold which can be determined by experimentation, $D_i$ is decreased since scenes with little motion are encoded more efficiently, so fewer bits can be used for coding.

At block 324, if the previous quantization level, $QUANT_{previous}$, is greater than an upper threshold, which can be determined by experimentation, $D_i$ is increased. This is done to avoid oscillations in the quantization level that may be noticeable to the viewer. Additionally, note that since the quantization level may vary with the picture type, the quantization level should be taken only from similar picture types, e.g., from B-pictures or P-pictures. Moreover, the quantization level can be run through a fast attack, slow decay function to avoid fluctuations in the bit rate. Such a function can be implemented in a filter that allows a rapid increase in the quantization level but only a slow decrease.

Thus, $QUANT_{previous}$ may represent a value that is a function of the actual quantization level of one or more previous frames.

Next, at block 326, the length of the GOP is used to modify the bit rate demand $D_i$. Note that according to the MPEG-2 or similar video standards, a group of pictures includes at least one I-picture, which is intra coded without reference to any other picture, followed by a number of inter-coded or predicted pictures such as B-pictures and P-pictures.

A B-picture is a bi-directionally predicted picture which uses both previous and future pictures (in presentation order) for prediction. A P-picture uses only a previous picture for prediction. Therefore, with successive GOPs, each having one I-picture, a frequency of I pictures in the data stream can be determined. Therefore, at block 326, if the nominal GOP is more than fifteen pictures in length, $D_i$ should be decreased. This accounts for the relationship between the required bit rate and the frequency of I-pictures.

That is, the frequency of I-pictures is generally inversely proportional to the length of the GOPs. Moreover, for a given picture quality, fewer bits are needed to code pictures in a larger GOP since there are relatively more inter-coded pictures, and inter-coded pictures (B-pictures and P-pictures) require fewer bits to code than I-pictures. Conversely, more bits are needed to code pictures in a smaller GOP since there are relatively fewer inter-coded pictures.

The nominal GOP length for adjusting the bit rate need not be fifteen pictures, but this value has been determined by the inventors to be satisfactory. It is possible to use higher and/or lower GOP length thresholds.

FIG. 3B is Part B of the flowchart of FIG. 3A illustrating how bit rate demand $D_i$ is determined in accordance with the present invention. At block 328, if the length of the GOP is less than fifteen pictures, an increase is set for $D_i$. At block 330, the magnitude of the increase or decrease of $D_i$ based on the length of the GOP is reduced if the inter-frame distance $INTER_{dist}$ is greater than an upper threshold which can be determined by experimentation. That is, the magnitude of the adjustment is reduced when the inter-frame activity is high since a large amount of motion is likely to cause intra-coding in all pictures, thereby countering the effect of the I-frame frequency. The decrease of block 326 and the increase of block 328 may even be eliminated for very high levels of inter-frame activity. At block 332, $D_i$ is modified by the adjusted increase or decrease, if any.

At block 334, $D_i$ is adjusted based on the horizontal resolution of the current frame. Specifically, $D_i$ is increased if the horizontal resolution is greater than a baseline level, and $D_i$ is decreased if the resolution is less than the baseline level. For example, if the baseline level corresponds to standard NTSC video, additional bits will be allocated for High Definition Television (HDTV). At block 336, if the brightness is less than a threshold that can be determined by experimentation, $D_i$ is increased. The bit rate is increased for relatively dark scenes, since such scenes generally are not coded efficiently. At block 338, if a scene change is detected, $D_i$ is set to a maximum value. This is done since scene changes generally are also not coded efficiently, even more so than dark scenes.

At block 340, $D_i$ is clipped between maximum and minimum values and linearly scaled to a predetermined range, e.g. 50 to 700.

At block 342, the allocated bit rate $D_i$ is optionally further adjusted by a priority factor according to the relative importance of the video channel. Assuming a base line priority factor of "1", for example, a relatively more important video channel will have a priority factor greater than "1", while a relatively less important video channel will have a priority factor less than "1". For example, it may be desirable to assign a relatively high priority factor to movies and special sporting events, while a relatively low priority factor is assigned to common news broadcasts. The priority factor may be specified by an operator using a keyboard or other input device that communicates with the central control 170 of FIG. 1. Also at block 342, $D_i$ is normalized, for example, by dividing by 128.

At block 344, the final bit rate demand $D_i$ is now available for use by the central control 170 in allocating the bit rate $R_i$ for each ith channel as set forth in FIG. 5 and the accompanying discussion below.

FIGS. 4, 4A and 4B illustrate how macroblock activity is calculated in accordance with the present invention. As each picture in encoded, an activity value is generated for each macroblock in the current picture. Each 16×16 luma value macroblock is subdivided into 2×2 tiles, and the values in each tile are examined. In each tile, the absolute difference in luma values between one corner (either the top right or bottom left) and its horizontal and vertical neighbors is taken. For example, in FIG. 4 a macroblock shown generally at 400 includes tiles 410 and 420. Tile 410 includes pixel "a" 412, pixel "b" 414, pixel "c" 416 and pixel "d" 418. The tile activity is the absolute value of b–a plus the absolute value of b–d. Tile 420 includes a pixel "a" 422, pixel "b" 424, pixel "c" 426, and pixel "d" 428. The tile activity is the absolute value of c–a plus the absolute value of c–d.

The absolute difference terms for each tile are summed to give the macroblock activity. The macroblock activity values are then summed across the entire current picture and divided by the total number of macroblocks in the picture to obtain the picture's average spatial activity. The average spatial activity may then be reported to the pre-processor.

Of course, the activity calculation procedure shown may be modified in various ways. For example, the tile size may be varied along with the selected reference pixel in each tile.

Figure 5B:
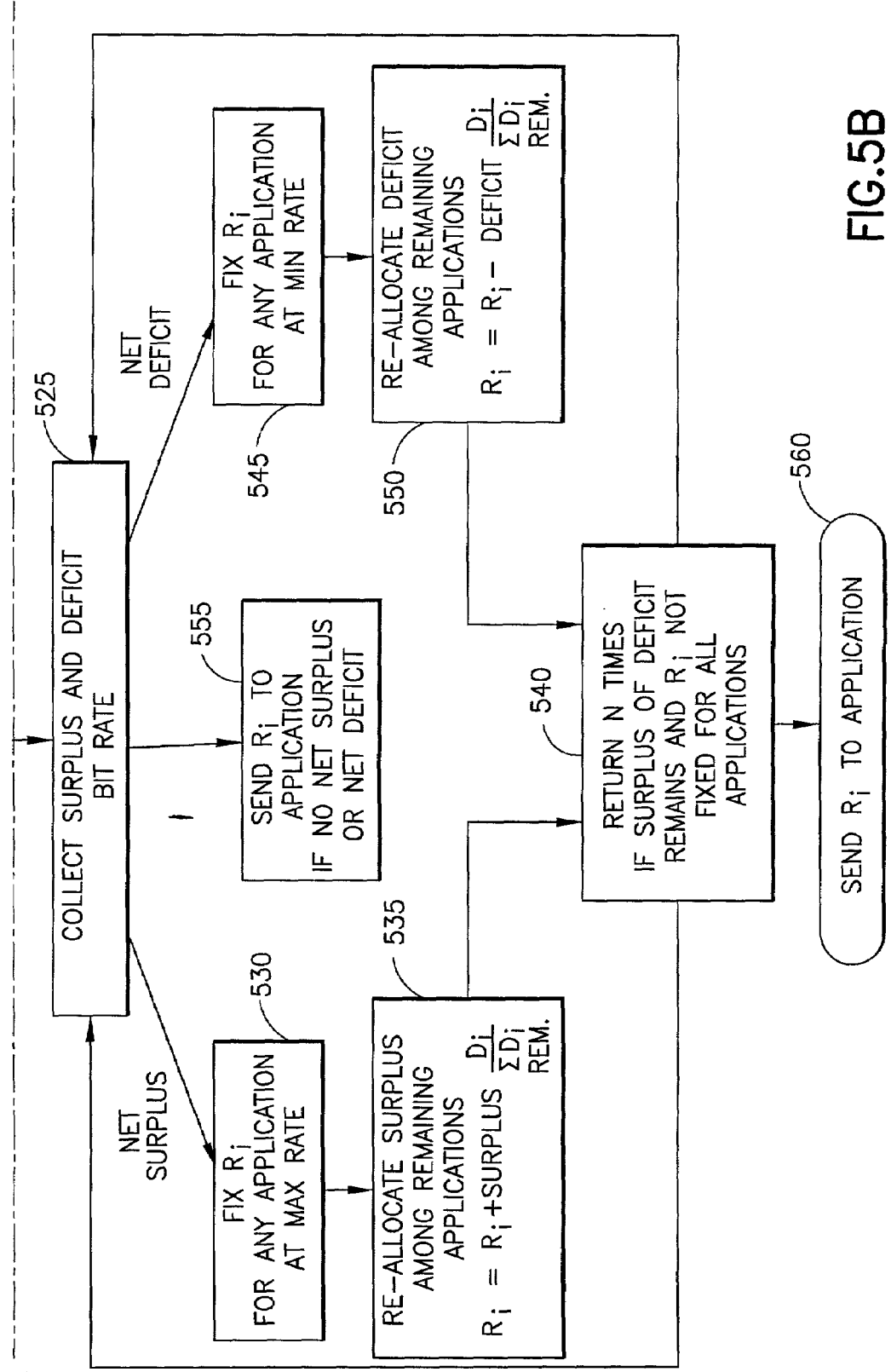
FIG. 5 is a flow chart illustrating how allocated bit rate $R_i$ is determined for several channels of a multi-channel video encoder.

FIG. 5 is a flow chart illustrating how allocated bit rate $R_i$ is determined for several channels of a multi-channel video encoder. Once the bit rate demand $D_i$ has been determined by the pre-processors for each video channel as explained in connection with FIGS. 3A and 3B, it is forwarded to the central control 170, as shown in FIG. 1. The central control 170 uses the demand signals $D_i$ to determine corresponding allocated bit rate signals $R_i$ for each ith channel. Generally, one or more iterations may be used by the control to arrive at a final $R_i$. That is, an initial $R_i$ may be fine tuned in successive iterations.

Referring to FIG. 5, at box 500, the central control solicits the applications to obtain the bit rate demands $D_i$, e.g., every ten msec. The term "application" is used generally to refer to each channel encoder, which comprises the combination of a pre-processor and compressor for each channel. At box 505, if an application does not respond to the control's request within a predetermined amount of time, for example, eighty msec., the control marks that application as "dead" or "inactive" and sets $D_i$ to a minimum value. An application may or may not respond to a solicitation based on whether it has computed new need information. That is, the application need not respond to a solicitation if it has not computed a new need value, $D_i$. The control retains the most recent need value from each application. The application remains in a minimum rate status until it responds to a subsequent control solicitation in which case the application is marked as alive and is allocated the currently determined rate $R_i$.

Each time the updated bit rate needs $D_i$ have been received from at least one-half of the alive VBR applications, for example, the control executes the bit allocation procedure. Upon completion of the procedure, $R_i$ is sent to each application even if the application's new rate is the same as the old rate. The control and MUX implement the transport stream schedule according to the specified fixed rates, if any, and the calculated variable rates.

At box 510, the sum of the bit rate requests from the dead applications is subtracted from an available bit rate. The available bit rate may be a fixed amount that is known a priori or may vary with time. The available bit rate is the overall amount of channel bandwidth that is currently allocated for transmitting the data from each VBR video channel. This available bit rate may correspond to a transport bit rate minus the fixed rate allocations for any fixed rate channels that are multiplexed with the VBR channels. At block 515, the remaining bit rate is allocated to the alive or active applications in proportion to their need values. At block 520, each allocated rate is examined to see if it exceeds the application's specified minimum or maximum rate. If so, the allocated rate is clipped to the appropriate minimum of maximum limit.

At block 525, any surplus and deficit bit rate from each channel is collected (e.g., summed) to form a net surplus or net deficit bit rate. A net surplus occurs when the available bit rate is greater than the sum of the allocated bit rates, while a net deficit occurs when the opposite is true. Note that a surplus for one channel can offset a deficit for another channel. At block 530, if a net surplus is present, any application at its maximum rate is eliminated from further adjustments until the next iteration of the process, if any. Similarly, at block 545, if a net bit rate deficit is present, any application at its minimum rate is eliminated from further adjustments until the next iteration of the process, if any.

At block 535, the net surplus bit rate is reallocated among the remaining applications in proportion to their need values. Similarly, at block 550, the net deficit is reallocated among the remaining applications in proportion to their need values. At block 555, if there is no net surplus or net deficit present, the allocated bit rate $R_i$ is communicated from the central control 170 to each compressor. The video data is compressed and encoded according to the final value of $R_i$ and communicated to the MUX 180.

At block 540, the reallocation of the net surplus or net deficit may be repeated in successive reiterations if a net surplus or net deficit is still present and the bit rate has not been fixed at a minimum or maximum value for all applications. The process may be repeated at block 525 for an additional two iterations, for example. Limiting the process to a maximum of three iterations is done to limit computation time. However, it should be appreciated that the present invention may also be implemented with one or more iterations.

If a net surplus or net deficit exists after the third iteration, it is distributed equally among all applications that remain available for adjustment; that is, the applications that are not dead or fixed. At block 560, the final allocated bit rate $R_i$ is communicated to the compressors for each ith channel.

An operator may control the bandwidth allocated to each application via bit-rate setting. Any application can be set to a fixed bit rate. A video encoder can alternatively be set to a variable bit rate (VBR) through the specification of a minimum and maximum bit rate. The minimum transport bit rate required for a multi-channel video encoder is equal to the sum of the fixed bit rates plus the sum of the minimum VBR rates, that is:

$$MinimumNecessaryBitrate = \Sigma FixedRate + \Sigma VBRMinRates.$$

Similarly, the maximum usable bandwidth is the sum of the fixed bit rates plus the sum of the maximum VBR rates:

$$MaximumUseableBitrate = \Sigma FixedRate + \Sigma VBRMaxRates.$$

If the available transport bit rate is less than the minimum required bit rate, the system cannot comply with the specified configuration. If the available transport bit rate is greater than the maximum useable bit rate, then all VBR applications run at their respective maximum rates, and no statistical multiplexing will occur. If the available transport rate is between the minimum and maximum bit rates, statistical multiplexing occurs, and the entire available transport bandwidth is allocated among the different channels.

Prior to encoding each picture, each VBR channel encoder checks for a new allocated bit rate, $R_i$, from the control. If there is a new rate, the channel encoder is commanded to compress and encode the channel data at the new rate.

Regarding timing of the rate control scheme, as discussed, a frame activity value is calculated in the respective channel encoders and made available to the control at the frame rate. For standard NTSC encoding, the update interval is every 33 msec., while for PAL it is every 40 msec., and for NTSC with detelecine, the time between updates is 33 msec. and 50 msec.

Preferably, the control executes its bit allocation process each time it has updates from at least one-half of the VBR applications. This should occur no less frequently than every fifty msec.

As can be seen, the present invention provides a system for allocating a bit rate to a plurality of variable rate channels in a video encoder according to the bit rate demand from each channel and the available bit rate. Advantageously, a bit rate demand $D_i$ is determined in a pre-processor for each channel prior to compressing and encoding the data for transmission. The allocated bit rate $R_i$ may be determined from the $D_i$ values in one or more iterations.

The bit rate demand $D_i$ accounts for various characteristics of the current picture data in each channel, including spatial activity, temporal activity, image size, frame rate, scene change, brightness, flash, fade, and horizontal pixel resolution. The system also biases the bit rate allocation according to inter-frame distance, whether the average spatial activity level is below a lower threshold, whether the inter-frame distance is above an upper threshold or below a lower threshold, whether the quantization of previous frames is above an upper threshold, the length of the Group of Pictures (GOP), and a user-selectable priority factor. The system also allocates any surplus bit rate among the channels to avoid having unused bandwidth.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for determining a bit rate need of a plurality of variable rate video channels in a video encoder, comprising the steps of:
  processing video data from a current picture in each respective channel to determine at least a spatial activity and a temporal activity thereof;
  determining a bit rate demand for each current picture according to the associated spatial activity and temporal activity;

determining whether characteristics of the current pictures exist for adjusting the initial bit rate demand thereof, and if so, adjusting the initial bit rate demand, determining an overall available bit rate for transmitting the current pictures in a multiplexed data stream;

determining, in an initial iteration, an initial allocated bit rate for each current picture according to a ratio of bit rate demand thereof to a sum of the bit rate demands from each current picture;

determining a bit rate surplus or deficit between the overall available bit rate and a sum of the initial allocated bit rates; and adjusting, in at least one successive iteration, the initial allocated bit rate for at least some of the current pictures according to the surplus or deficit and a ratio of bit rate demand thereof to a sum of the bit rate demands thereof.

2. A method in accordance with claim 1, comprising the further step of:

adjusting said initial bit rate demand for each current picture according to whether a scene change is detected for the current picture.

3. A method in accordance with claim 1, comprising the further step of:

adjusting said initial bit rate demand for each current picture according to whether a fade is detected for the current picture.

4. A method in accordance with claim 1, comprising the further step of:

adjusting said initial bit rate demand for each current picture according to whether a flash is detected for the current picture.

5. A method in accordance with claim 1, comprising the further step of:

for at least one current picture, determining whether the associated spatial activity is below a lower threshold, and if so, increasing the associated temporal activity thereof, and adjusting the initial bit rate demand thereof according to the increased temporal activity thereof.

6. A method in accordance with claim 1, comprising at least one of the further steps of, for at least one current picture:

adjusting the initial bit rate demand thereof upwards when the associated temporal activity exceeds an upper threshold; and adjusting the initial bit rate demand thereof downwards when the associated temporal activity is less than a lower threshold.

7. A method in accordance with claim 1, comprising the further step of:

for at least one current picture, adjusting the initial bit rate demand thereof upwards when a quantization level of at least one previous picture associated therewith of a same picture type exceeds an upper threshold.

8. A method in accordance with claim 1, comprising at least one of the further steps of, for at least one current picture:

adjusting the initial bit rate demand thereof downwards when a length of an associated group of pictures exceeds a nominal level; and adjusting the initial bit rate demand thereof upwards when a length of an associated group of pictures is less than a nominal level.

9. A method in accordance with claim 8, comprising the further step of, for the at least one current picture:

tempering the upwards or downward adjusting of the initial bit rate demand thereof when the temporal activity thereof exceeds an upper threshold.

10. A method in accordance with claim 1, comprising the further step of:

for at least one current picture, adjusting the initial bit rate demand thereof according to whether a horizontal pixel resolution thereof exceeds or is less than a nominal level.

11. A method in accordance with claim 1, comprising the further step of:

for at least one current picture, adjusting the initial bit rate demand thereof upwards when an associated brightness level is less than a lower threshold.

12. A method in accordance with claim 1, comprising the further step of:

for at least one current picture, adjusting the initial bit rate demand thereof according to a priority factor thereof which indicates a relative importance of the at least one current picture in the multiplexed data stream.

13. An apparatus for determining a bit rate need of a plurality of variable rate video channels in a video encoder, comprising:

means for processing video data from a current picture in each respective channel to determine at least a spatial activity and a temporal activity thereof;

means for determining a bit rate demand for each current picture according to the associated spatial activity and temporal activity;

means for determining whether characteristics of the current pictures exist for adjusting the initial bit rate demand thereof, and if so, adjusting the initial bit rate;

means for determining an overall available bit rate for transmitting the current pictures in a multiplexed data stream;

means for determining, in an initial iteration, an initial allocated bit rate for each current picture according to a ratio of bit rate demand thereof to a sum of the bit rate demands from each current picture;

means for determining a hit rate surplus or deficit between the overall available bit rate and a sum of the initial allocated bit rates; and means for adjusting, in at least one successive iteration, the initial allocated bit rate for at least some of the current pictures according to the surplus or deficit, and a ratio of bit rate demand thereof to a sum of the bit rate demands thereof.

14. The apparatus of claim 13, further comprising:

means for adjusting said initial bit rate demand for each current picture according to whether a scene change is detected for the current picture.

15. The apparatus of claim 13, further comprising:

means for adjusting said initial hit rate demand for each current picture according to whether a fade is detected for the current picture.

16. The apparatus of claim 13, further comprising:

means for adjusting said initial bit rate demand for each current picture according to whether a flash is detected for the current picture.

17. The apparatus of claim 13, further comprising:

means for determining, for at least one current picture, whether the associated spatial activity is below a lower threshold, and if so, increasing the associated temporal activity thereof, and adjusting the initial bit rate demand thereof according to the increased temporal activity thereof.

18. The apparatus of claim 13, wherein, for at least one current picture, the apparatus further comprises:
means for adjusting the initial bit rate demand thereof upwards when the associated temporal activity exceeds an upper threshold; and
means for adjusting the initial bit rate demand thereof downwards when the associated temporal activity is less than a lower threshold.

19. The apparatus of claim 13, further comprising:
means for adjusting, for at least one current picture, the initial bit rate demand thereof upwards when a quantization level of at least one previous picture associated therewith of a same picture type exceeds an upper threshold.

20. The apparatus of claim 13, wherein, for at least one current picture, the apparatus further comprises:
means for adjusting the initial bit rate demand thereof downwards when a length of an associated group of pictures exceeds a nominal level; and
means for adjusting the initial bit rate demand thereof upwards when a length of an associated group of pictures is less than a nominal level.

21. The apparatus of claim 20, wherein, for the at least one current picture, the apparatus further comprises:
means for tempering the upward or downward adjusting of the initial bit rate demand thereof when the temporal activity thereof exceeds an upper threshold.

22. The apparatus of claim 13, further comprising:
means for adjusting, for at least one current picture, the initial bit rate demand thereof according to whether a horizontal pixel resolution thereof exceeds or is less than a nominal level.

23. The apparatus of claim 13, further comprising:
means for adjusting, for at least one current picture, the initial bit rate demand thereof upward when an associated brightness level is less than a lower threshold.

24. The apparatus of claim 13, further comprising:
means for adjusting, for at least one current picture, the initial bit rate demand thereof according to a priority factor thereof which indicates a relative importance of the at least one current picture in the multiplexed data stream.

* * * * *